US007459203B2

(12) United States Patent
Pickering

(10) Patent No.: US 7,459,203 B2
(45) Date of Patent: Dec. 2, 2008

(54) FUSER MEMBER

(75) Inventor: Jerry A. Pickering, Hilton, NY (US)

(73) Assignee: Eastman Kodak Company, Rochester, NY (US)

( * ) Notice: Subject to any disclaimer, the term of this patent is extended or adjusted under 35 U.S.C. 154(b) by 392 days.

(21) Appl. No.: 11/281,868

(22) Filed: Nov. 17, 2005

(65) Prior Publication Data

US 2007/0110994 A1 May 17, 2007

(51) Int. Cl.

| | |
|---|---|
| ***B32B 25/02*** | (2006.01) |
| ***B32B 25/04*** | (2006.01) |
| ***B32B 25/14*** | (2006.01) |
| ***B32B 25/20*** | (2006.01) |
| ***G03G 15/20*** | (2006.01) |

(52) U.S. Cl. ....................... 428/212; 428/215; 428/327; 428/421; 428/447; 399/333

(58) Field of Classification Search ....................... None
See application file for complete search history.

(56) References Cited

U.S. PATENT DOCUMENTS

| | | | | |
|---|---|---|---|---|
| 4,011,362 | A | | 3/1977 | Stewart |
| 4,029,827 | A | | 6/1977 | Imperial et al. |
| 4,046,795 | A | | 9/1977 | Martin |
| 4,101,686 | A | | 7/1978 | Strella et al. |
| 4,185,140 | A | | 1/1980 | Strella et al. |
| 4,257,699 | A | | 3/1981 | Lentz |
| 4,515,884 | A | | 5/1985 | Field et al. |
| 5,017,432 | A | | 5/1991 | Eddy et al. |
| 5,177,552 | A | | 1/1993 | Isogai et al. |
| 5,269,740 | A | * | 12/1993 | Fitzgerald et al. ............. 492/56 |
| 5,455,313 | A | | 10/1995 | Kurusu et al. |
| 5,480,930 | A | | 1/1996 | Gentle et al. |
| 5,530,536 | A | | 6/1996 | Henry et al. |
| 5,531,813 | A | | 7/1996 | Henry et al. |
| 5,582,917 | A | | 12/1996 | Chen et al. |
| 5,608,508 | A | | 3/1997 | Kumagai et al. |
| 5,780,545 | A | | 7/1998 | Chen et al. |
| 5,781,840 | A | | 7/1998 | Chen et al. |
| 5,803,887 | A | * | 9/1998 | Fukunaga .................... 492/59 |
| 5,824,416 | A | | 10/1998 | Chen et al. |
| 6,011,946 | A | | 1/2000 | Eddy et al. |
| 6,117,508 | A | | 9/2000 | Parsonage et al. |
| 6,127,041 | A | | 10/2000 | Szostek et al. |
| 6,281,279 | B1 | | 8/2001 | Davis et al. |

OTHER PUBLICATIONS

Nielsen, "The Thermal and Electrical Conductivity of Two-Phase Systems," Ind. Eng. Chem. Fundam., 1974, vol. 13, No. 1, pp. 17-20.

* cited by examiner

*Primary Examiner*—Ramsey Zacharia
(74) *Attorney, Agent, or Firm*—Carl F. Ruoff

(57) ABSTRACT

A fuser roller for toner fusing systems and processes, and including a base and a fusing surface layer. The fusing surface layer has a first elastomer continuous phase and a second elastomer discontinuous phase; the discontinuous phase is dispersed through the continuous phase in the form of domains. The second elastomer is wettable by the first elastomer, and at the temperature of the fusing process, the modulus of the second elastomer is greater than the modulus of the first elastomer. The swell levels of the first and second elastomers both are greater than zero, with the swell level of the second elastomer being lower than the swell level of the first elastomer.

18 Claims, 2 Drawing Sheets

FUSER MEMBER

CROSS-REFERENCE TO CONCURRENTLY FILED APPLICATION

Filed concurrently with this Application is the application Ser. No. 11/281,856 entitled "Fuser Member System and Process". This concurrently filed application is incorporated herein in its entirety, by reference thereto.

BACKGROUND OF THE INVENTION

The present invention relates to electrostatographic imaging and recording apparatus, and to assemblies in these apparatus for fixing toner to the substrates. The present invention relates particularly to fuser members, and fusing surface layers for fuser members, in the toner fixing assemblies.

Generally in electrostatographic reproduction, the original to be copied is rendered in the form of a latent electrostatic image on a photosensitive member. This latent image is made visible by the application of electrically charged toner.

The toner forming the image is transferred to a substrate, also referred to in the art as a "receiver", such as paper or transparent film, and fixed or fused to the substrate. Where heat softenable toners, for example, thermoplastic polymeric binders, are employed, the usual method of fixing the toner to the substrate involves applying heat to the toner, once it is on the substrate surface, to soften it, and then allowing or causing the toner to cool. This application of heat in the fusing process is preferably at a temperature of about 90° C.-220° C.; pressure may be employed in conjunction with the heat.

A system or assembly for providing the requisite heat and pressure is generally provided as a fusing subsystem, and customarily includes a fuser member and a support member. The various members that comprise the fusing subsystem are considered to be fusing members; of these, the fuser member is the particular member that contacts the toner to be fused by the fusing subsystem. The heat energy employed in the fusing process generally is transmitted to toner on the substrate by the fuser member. Specifically, the fuser member is heated; to transfer heat energy to toner situated on a surface of the substrate, the fuser member contacts this toner, and correspondingly also can contact this surface of the substrate itself. The support member contacts an opposing surface of the substrate.

Accordingly, the substrate can be situated or positioned between the fuser and support members, so that these members can act together on the substrate to provide the requisite pressure in the fusing process. In cooperating, preferably the fuser and support members define a nip, or contact arc, through which the substrate passes. Also as a matter of preference, the fuser and support members are in the form of fuser and pressure rollers, respectively. Yet additionally as a matter of preference, one or both of the fuser and support members have a soft layer that increases the nip, to effect better transfer of heat to fuse the toner.

During the fusing process toner can be offset from the substrate to the fuser member. Toner transferred to the fuser member in turn may be passed on to other members in the electrostatographic apparatus, or to subsequent substrates subjected to fusing.

Toner on the fusing member therefore can interfere with the operation of the electrostatographic apparatus and with the quality of the ultimate product of the electrostatographic process. This offset toner is regarded as contamination of the fuser member. Therefore, improving the release of the fuser member fusing surface layer, and thereby preventing or at least minimizing this contamination, is a desirable objective.

Silicones, used for fuser member surfaces, are known to provide good release in toner fusing systems. However, the life of silicone fuser member surfaces is limited, because they suffer from wear due to abrasion by the receiver.

Further in this regard, release agents, such as silicone release fluids, can be applied to fuser members during the fusing process to combat toner offset. However, silicone fuser member surfaces may swell when used in conjunction with these agents. And this swell also is a factor that limits fuser member surface life, because it causes the surface to wear and degrade faster. Such wear may be reduced by increasing the silicone crosslink density; however, such increased crosslink density typically leads to brittle materials unsuitable for use as fuser member surfaces.

Reinforcing fillers, such as inorganic fillers, have been incorporated into fuser member fusing surface layers—both to reduce the indicated swell, and to provide desired material properties, such as resistance to wear, modulus and tear. Unfortunately, most inorganic fillers are characterized by high surface energy; because of this property they serve as sites for toner to adhere to, and thereby contaminate the fuser member surface. Polyester toners in particular are especially prone to interacting with high energy sites in this manner to cause such contamination.

Fluorosilicones and phenylsilicones have also been used to reduce swell caused by release agents. However, these materials suffer the same detrimental effects when reinforcing fillers are employed.

Low surface energy reinforcing fillers, such as polytetrafluoroethylene (PTFE) particulate fillers, have been employed. While these provide certain benefits, they are not always suitable. PTFE fillers have been found to have poor compatibility with silicones, and therefore their inclusion in silicone fusing surface layers has resulted in high wear rates.

It is accordingly an object of this invention to provide a fuser member fusing surface layer that not only exhibits good resistance against offset, against contamination—particularly by polyester toners—but also does not suffer excessive swell from release agents, especially silicone release agents. It is further an object of this invention to provide a fusing surface layer having good wear resistance. It is yet additionally an object of this invention to provide a fusing surface layer that does not require the presence of high energy reinforcing fillers.

SUMMARY OF THE INVENTION

The fuser member of the invention is for toner fusing systems and processes, and comprises a base and a fusing surface layer. The fusing surface layer comprises a first elastomer as a continuous phase, and a second elastomer as a discontinuous phase, dispersed through the continuous phase in the form of domains.

The second elastomer is wettable by the first elastomer. Particularly, the second elastomer discontinuous phase domains are wettable by the first elastomer continuous phase. This wettability is a factor in causing the domains and the continuous phase to adhere together, and correspondingly it combats interfacial failure between these continuous and discontinuous elastomer phases.

At the temperature of the fusing process, the modulus of the second elastomer is greater than the modulus of the first elastomer. By virtue of its higher modulus, the second elastomer discontinuous phase serves as a reinforcing agent for the fusing surface layer. The second elastomer domains provide desired material properties e.g., increased tear resistance, wear inhibition, and the like—to the continuous phase, and accordingly to the fusing surface layer in its entirety.

The swell level of the first elastomer is greater than zero. The swell level of the second elastomer also is greater than zero, and is less than the swell level of the first elastomer.

The lower swell of the elastomer domains reduces the swell of the fusing surface layer as a whole; but because of their lower surface energy, the elastomer domains accomplish this effect without presenting the high energy sites for toner contamination that are provided by inorganic filler. And because the elastomer domains accordingly do not present such high energy sites, the resistance of the fusing surface layer to toner offset is improved.

A particularly significant feature of the invention pertains to the indicated swell of the second elastomer. Specifically, in contrast to inorganic and plastic fillers, the discontinuous phase domains swell from contact with release agent in liquid form, with the swell resulting from absorption of the release agent.

Second elastomer domains swollen with release agent will have some of the agent residing on the domains' surface, acting as a weak boundary layer. As this layer is removed during the fusing process, it is renewed by release agent coming up from within the swollen domains i.e., swollen by the release agent they contain.

The domains accordingly act as a reservoir for release agent. So particularly as opposed to inorganic fillers, which provide high surface energy sites for toner to adhere to, the second elastomer discontinuous phase domains of the invention where release agent is employed are characterized by a renewing boundary layer that combats toner offset.

DESCRIPTION OF THE INVENTION

Figure 1:
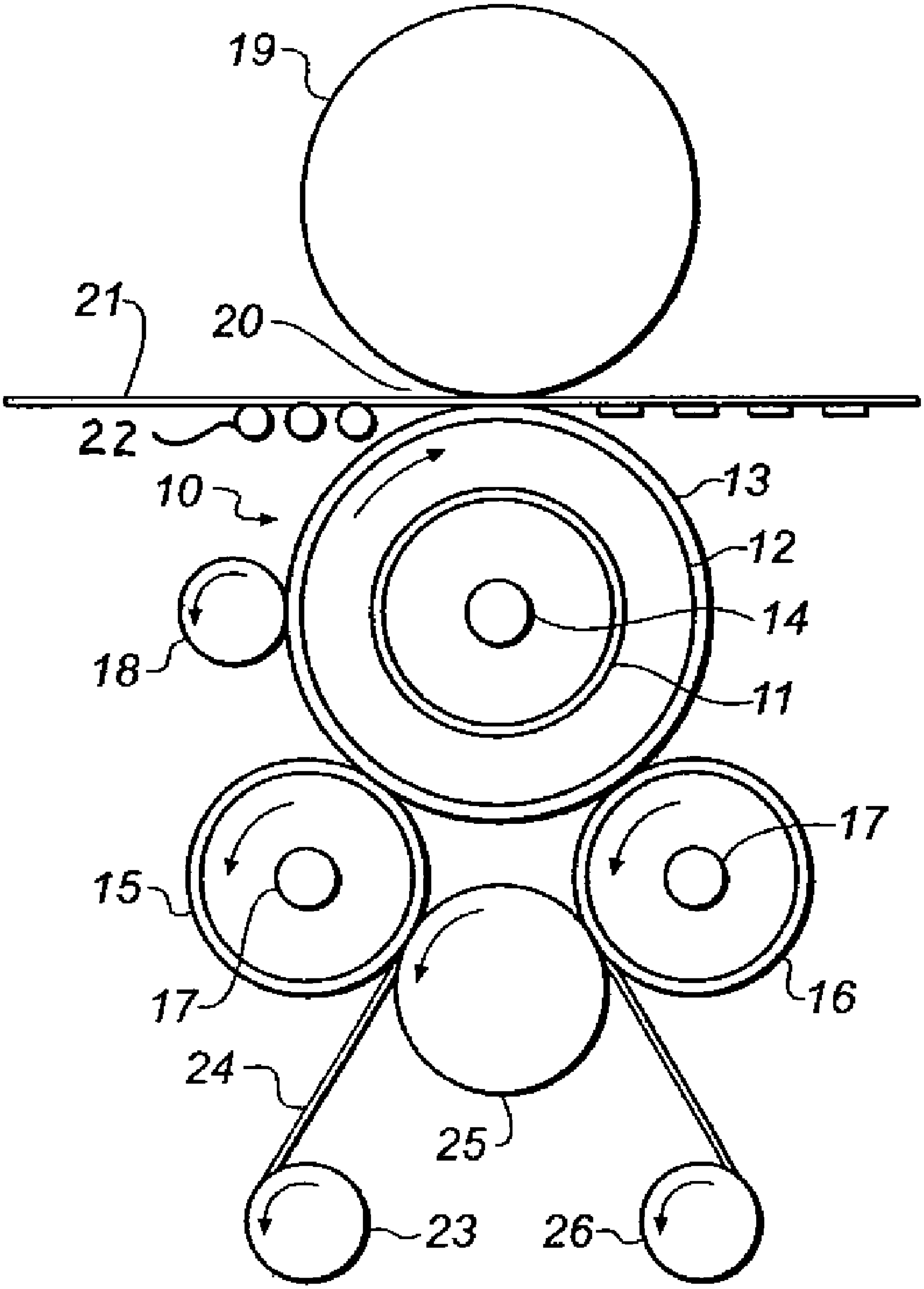
FIG. 1 is a schematic representation, and a sectional view, of a toner fusing assembly of the invention.

Fusing or operating temperatures, or the temperature of the fusing process, are understood as being within the range of from about 90° C. to about 250° C. The preferred temperatures are generally within the range of from about 120° C. to about 200° C., more preferably from about 150° C. to about 185° C., still more preferably from about 160° C. to about 180° C.

Copolymers are understood as including polymers incorporating two different monomeric units, i.e., bipolymers, as well as polymers incorporating three or more different monomeric units, e.g., terpolymers, quaterpolymers, etc.

Elastomers are understood as including polymers that are nonelastomeric at room temperature but elastomeric at fusing or operating temperatures. Polyorganosiloxanes are understood as including polydiorganosiloxanes i.e., having two organo groups attached to each of the polymer siloxy repeat units.

Polyorganosiloxanes are further understood as including polydimethylsiloxanes. Functional polyorganosiloxanes are understood as having functional groups on the backbone, connected to the polysiloxane portion, which can react with fillers present on the surface of the fuser member, or with a polymeric fuser member surface layer or component thereof. Functional polyorganosiloxanes further are understood as having functional groups such as amino, hydride, halo (including chloro, bromo, fluoro, and iodo), carboxy, hydroxy, epoxy, isocyanate, thioether, and mercapto functional groups.

The term "organo" as used herein, such as in the context of polyorganosiloxanes, includes hydrocarbyl, which includes "aliphatic", "cycloaliphatic", and "aromatic". The hydrocarbyl groups are understood as including the alkyl, alkenyl, alkynl, cycloalkyl, aryl, aralkyl, and alkaryl groups. Further, "hydrocarbyl" is understood as including both nonsubstituted hydrocarbyl groups, and substituted hydrocarbyl groups, with the latter referring to the hydrocarbyl portion bearing additional substituents, besides the carbon and hydrogen. Preferred organo groups for the polyorganosiloxanes are the alkyl, aryl, and aralkyl groups. Particularly preferred alkyl, aryl, and aralkyl groups are the $C_1$-$C_{18}$ alkyl, aryl, and aralkyl groups, particularly the methyl and phenyl groups.

The second elastomer is wettable by the first elastomer i.e., the first elastomer wets the second elastomer if the contact angle of the first elastomer on the second elastomer is about 10 degrees or less. Where this contact angle is zero, then the second elastomer is wettable by the first elastomer, and further, the second elastomer is spontaneously wettable by the first elastomer—i.e., the first elastomer spontaneously wets the second elastomer.

As another means for determining wetting, or wettability, the second elastomer is wettable by the first elastomer i.e., the first elastomer wets the second elastomer, if $$([\gamma 2nd-\gamma 1st,2nd]/\gamma 1st) \geqq 0.98$$

wherein $\gamma$1st=the first elastomer surface tension $\gamma$2nd=the second elastomer surface tension $\gamma$1st,2nd=the interfacial tension between the first elastomer and the second elastomer.

The foregoing method is useful, where the contact angle cannot be determined.

Unless stated otherwise, modulus is measured as tensile modulus of elasticity, using dynamic mechanical analysis, at a frequency equal to the frequency of the fuser member. The fuser member frequency pertains to the 360° rotation of the member, in the case of fuser members that operate in the fusing process by rotation (e.g., fuser members with bases in the form of cylindrical cores, or of belts on rollers, or of core-mounted plates) and in the case of other fuser members, to their equivalent movement.

Thermally conductive filler is filler, such as particulate material, having a thermal conductivity greater than five times the inherent thermal conductivity of the first elastomer continuous phase.

Where the second elastomer domains are in the particulate form, their mean diameter is mean particle diameter.

Unless stated otherwise, molecular weights set forth herein are number average molecular weights ($M_n$), measured in Daltons.

The fuser member of the invention includes a fuser base, and a fusing surface layer overlaying the fuser base. The fusing surface layer can reside directly on the fuser base. Alternatively, there can be one or more materials and/or layers, including one or more cushion layers, interposed between the fuser base and the fusing surface layer.

The fusing surface layer comprises a first elastomer as a continuous phase, and a second elastomer dispersed through the continuous phase in the form of domains.

The first and second elastomers may also be referred to as first and second polymers, respectively. Particularly, polymers to be cured to form the first and second elastomers may be referred to as curable first and second polymers, respectively.

In this regard, the first elastomer is prepared by curing the corresponding curable first polymer, and the second elastomer likewise is prepared by curing the corresponding curable second polymer. In both cases, the curing affects crosslinking, to provide the resulting elastomer.

The crosslinking may be accomplished by suitable means, as are known in the art. For instance, reactive polymer and crosslinker can be reacted to provide the requisite crosslinked elastomer. Or crosslinking can be effected by interreaction of a reactive polymer e.g., by reaction between reactive chains of the polymer—without use of a crosslinker.

The first and second elastomers preferably are heat stable at temperatures of up to at least about 120° C., more preferably up to at least about 130° C., and still more preferably up to at least about 150° C. Particularly, the first and second elastomers preferably are heat stable at fusing or operating temperatures. This heat stability entails the absence of degradation, decomposition, sublimation, and release of byproducts.

Among the elastomers that are suitable as first and second elastomers are perfluoropolyethers, fluoroelastomers, and silicones, such as fluorosilicones. The silicone, or polyorganosiloxane, elastomers are preferred, and the polydimethylsiloxane elastomers are especially preferred.

Particularly, among the silicone elastomers that may be used are vinyl addition cure silicone elastomers, condensation cure silicone elastomers, and peroxide cure silicone elastomers. Of these, the polyorganosiloxane elastomers are preferred, and the polydimethylsiloxane elastomers are especially preferred. Further, of the vinyl addition cure silicone elastomers, condensation cure silicone elastomers, and peroxide cure silicone elastomers, the vinyl addition cure silicone elastomers and the condensation cure silicone elastomers are preferred.

A vinyl addition cure silicone elastomer that may be used is Silastic™—J silicone, from Dow Coming. Corporation, Midland, Mich. This is a room temperature vulcanizate (RTV) silicone elastomer, and has a 60 Shore A durometer. A condensation cure silicone elastomer that may be used is LS4340-103 silicone, from Emerson & Cuming ICI, Billerica, Mass.; this is a RTV silicone elastomer, and has a 20 Shore A durometer. A condensation cure silicone elastomer composition that may be used is EC4952, also from Emerson & Cuming ICI, which has a 65 Shore A durometer, and comprises 64 percent by volume $Al_2O_3$, 0.8 percent by volume $Fe_2O_3$, and the remainder condensation cure RTV silicone elastomer. These three commercially available compositions are suitable both as first elastomers and as second elastomers.

The second elastomer is wettable by the first elastomer i.e., the first elastomer wets the second elastomer. Preferably, the second elastomer is spontaneously wettable by the first elastomer i.e., the first elastomer spontaneously wets the second elastomer.

The first elastomer and second elastomer accordingly are provided so that the former, as the continuous phase, does not readily debond from the domains of the latter—and so the reinforcement of the fusing surface layer, provided by the second elastomer domains, is maintained under stress. The indicated wetting, or wettability, feature maintains the requisite adhesion between the first and second elastomers, so that the continuous phase and the domains bind together, and resist phase separation. Therefore this compatability, of the first elastomer and the second elastomer, is advantageous for preserving the structure, the configuration, of the fusing layer, specifically, for preserving the relationship between the continuous and discontinuous phases.

Chemical similarity of the first and second elastomers can be a factor in providing their wetting, or wettability, feature. And where this chemical similarity indeed is such a factor, the greater the chemical similarity, the greater the adhesion and reinforcement can be provided.

In this regard, preferably at least about 15 percent of the second elastomer total repeat units, and at least about 15 percent of the first elastomer total repeat units, are the same monomeric unit. Stated more succinctly, preferably at least about 15 percent of the first and second elastomer total repeat units are the same monomeric unit.

Expressed in the same manner, more preferably at least about 25 percent still more preferably at least about 50 percent, still more preferably at least about 75 percent, still more preferably at least about 95 percent, still more preferably at least about 98 percent, still more preferably at least about 99 percent—of the first and second elastomer total repeat units are the same monomeric unit. And yet more preferably, from about 80 percent, or about 90 percent, or about 95 percent, to about 98 percent, or about 99 percent, or about 100 percent, of the first and second elastomer total repeat units are the same monomeric unit. As a matter of particular preference, all, or essentially all of the first and second elastomer total repeat units are the same monomeric unit.

Stated in terms of the foregoing criteria, where the second elastomer is a crosslinkable poly(dimethyl(65%)-diphenyl (35%))siloxane and the first elastomer is a curable polydimethylsiloxane, 65 percent of the first and second elastomer total repeat units are the same monomeric unit specifically, the dimethylsiloxy unit.

Repeat units that are involved in crosslinking are not included in determining proportions of identical repeat units in determining the percentages of total repeat units that are the same monomeric unit.

The modulus of the second elastomer discontinuous phase domains is higher than the modulus of the first elastomer continuous phase. Particularly at operating conditions, or at the temperature of the fusing process, or at the fusing temperature, the modulus of the second elastomer discontinuous phase domains is higher than the modulus of the first elastomer continuous phase.

Because of its higher modulus, the discontinuous phase serves to provide reinforcement under stress. The reinforcement provided by the discontinuous phase is also an advantageous feature for preserving the structure, the configuration of the fusing layer specifically, for preserving the relationship between the continuous and discontinuous phases.

The modulus of the second elastomer discontinuous phase domains preferably is about $2.3 \times 10^6$ Pa or greater, or from about $2.3 \times 10^6$ Pa to about $1 \times 10^8$ Pa, or from about $2.3 \times 10^6$ Pa to about $5 \times 10^7$ Pa, or from about $3.5 \times 10^6$ Pa to about $2 \times 10^7$ Pa. Particularly at fuser operating conditions, or at the temperature of the fusing process, or fusing temperature, the modulus of the second elastomer discontinuous phase domains preferably is about $2.3 \times 10^6$ Pa or greater, or from about $2.3 \times 10^6$ Pa to about $1 \times 10^8$ Pa, or from about $2.3 \times 10^6$ Pa to about $5 \times 10^7$ Pa, or from about $3.5 \times 10^6$ Pa to about $2 \times 10^7$ Pa.

The modulus of the first elastomer continuous phase preferably is about $2.5 \times 10^6$ Pa or less, or from about $3 \times 10^5$ Pa to about $2.5 \times 10^6$ Pa, or from about $4 \times 10^5$ Pa to about $2.5 \times 10^6$ Pa, or from about $5 \times 10^5$ Pa to about $1 \times 10^6$ Pa. Particularly at fuser operating conditions, or at the temperature of the fusing process, or fusing temperature, the modulus of the first elastomer continuous phase preferably is about $2.5\times10^6$ Pa or less, or from about $3\times10^5$ Pa to about $2.5\times10^6$ Pa, or from about $4\times10^5$ Pa to about $2.5\times10^6$ Pa, or from about $5\times10^5$ Pa to about $1\times10^6$ Pa.

As to the fusing surface layer taken in its entirety, this layer preferably has a modulus of from about $6\times10^5$ Pa to about $2\times10^7$ Pa, or from about $8\times10^5$ Pa to about $1\times10^7$ Pa, or from about $1\times10^6$ Pa to about $8\times10^6$ Pa. Particularly at fuser operating conditions, or at the temperature of the fusing process, or fusing temperature, the fusing surface layer preferably has a modulus of from about $6\times10^5$ Pa to about $2\times10^7$ Pa, or from about $8\times10^5$ Pa to about $1\times10^7$ Pa, or from about $1\times10^6$ Pa to about $8\times10^6$ Pa.

Elastomer swell levels are calculated from the increase that would result in any of the three dimensions i.e., height, length, or width of a sample of the elastomer, if the sample were treated with an excess amount of a release agent in liquid form. In this regard, an excess amount means more of the release agent than the sample can absorb, so that treatment with the excess amount means contacting the sample with enough of the release agent so that the sample achieves maximum release agent absorption, and still leaves an amount of the release agent unabsorbed.

The swell level of an elastomer is obtained from dividing the indicated increase in the length of the chosen dimension i.e., the increase that would result from the treatment with excess release agent by the original length of this dimension, without the release agent treatment. Swell level can be expressed as a percentage, and in this form is referred to as percent swell.

Swell levels are determined for the elastomers in pure form. For an elastomer containing filler, swell level is based on the elastomer portion alone. So determining the swell level of an elastomer that includes filler—from an actual sample of the filled elastomer—can be accomplished by mathematically accounting for the effect of the nonswelling filler.

For an elastomer including a portion of uncrosslinked polymer i.e., sol, the swell level is based on the elastomer with the sol removed. So once again as to actual practice, determining swell level from a sample can be accomplished by extracting the sol portion with a solvent, and calculating the true swell of the elastomer, absent the sol, mathematically.

Particularly as to the first elastomer and the second elastomer of the invention, the swell level of the first elastomer is greater than zero, and the swell level of the second elastomer also is greater than zero. Further, the swell level of the second elastomer is less than the swell level of the first elastomer. It is understood that this swell level comparison is based upon treatment of both elastomers with the same release agent.

Preferably the swell level of the first elastomer is from about 0.3, or about 0.2, or about 0.12,to about 0.005, or about 0.01; accordingly, preferably the percent swell of the first elastomer is from about 30 percent, or about 20 percent, or about 12 percent, to about 0.5 percent, or about 1 percent.

Preferably, the ratio of the second elastomer swell level to the first elastomer swell level is from about 0.8:1, or about 0.5:1, or about 0.25:1, to about 0.01:1, or about 0.02:1, or about 0.05:1. Just as swell level can be identified as a percentage i.e., as percent swell this ratio also can be referred to in that form. So expressed as a percentage, preferably the swell level of the second elastomer is from about 80 percent, or about 50 percent, or about 25 percent, to about 1 percent, or about 2 percent, or about 5 percent, of the swell level of the first elastomer. As with swell level comparison, it is also understood that swell level ratio and therefore, of course, the corresponding percentage likewise are based upon the treatment of both the first and the second elastomer with the same release agent.

Crosslink density affects the hardness, the modulus, as well as the swell, of both the first elastomer and the second elastomer of both the discontinuous phase domains and the continuous phase. Specifically, varying crosslink density varies hardness, varies modulus, as well as varying swell.

A higher crosslink density means a higher modulus, a greater hardness, and also means a lower swell level, for the elastomer the phase at issue. So increasing crosslink density increases modulus, increases hardness, and reduces swell level.

Conversely, a lower crosslink density means a lower modulus, a lower hardness, and also means a higher swell level. So lowering crosslink density decreases modulus, decreases hardness, and increases swell level.

Crosslink density can also be expressed as molecular weight between crosslinks. A higher crosslink density means lower molecular weight between crosslinks, and a lower crosslink density means a higher molecular weight between crosslinks.

For preparing the fusing surface layer of the invention, the second elastomer may be provided already in cured elastomer form, or as a curable polymer, to be crosslinked to form the second elastomer.

Employed as a cured material, the second elastomer may be provided already in final form e.g., as particles, as particulate, as preformed particles or particulate to serve as the domains dispersed in the first elastomer continuous phase. Particularly, the second elastomer discontinuous phase material may be provided already in particulate form, and added to curable first polymer for preparation of the fusing surface layer.

Alternatively, as a cured material, the second elastomer may be provided in bulk form e.g., as a slab, or otherwise solid material. This material may first be reduced to the desired particulate by suitable means, such as grinding, and then added to curable first polymer. Or, in this bulk form the second elastomer may be combined with the curable first polymer, with both polymers then together subjected to milling or grinding to produce second elastomer particulate in final form, dispersed in the still to be cured first polymer.

In the case of second elastomer being used in curable polymer form, it may be provided as a curable liquid or gum. Employed in curable form, the second polymer is combined in this state with the curable first polymer, and cured by the curing of the fusing surface layer, to provide the discontinuous phase domains. This curing, besides effecting crosslinking of the curable first polymer, to form the first elastomer, also affects crosslinking of the curable second polymer, to form the second elastomer.

Where curable second polymer is used, the discrete domains i.e., separate from, and dispersed through the first elastomer continuous phase are formed due to the immiscibility of the first and second curable polymers. This immiscibility may be caused by a difference in chemical composition between the first and second polymers, such as one having repeat units that are not present in the other; an example of such a difference would be a crosslinkable poly (dimethyl(85%)-diphenyl(15%)siloxane second polyomer, dispersed in a curable polydimethylsiloxane first polymer.

In a preferred embodiment, preformed silicone elastomer particulate, already cured, is employed as the second elastomer in preparing the fusing surface layer. The silicone elastomer particles are crosslinked particles of polyorganosiloxane, preferably polydiorganosiloxane, particularly preferably polydimethylsiloxane, elastomer.

The silicone elastomer particulate can be prepared by emulsion polymerization, or from bulk silicone by grinding, or otherwise reducing the material to discrete particles. Particularly, the crosslinked polydiorganosiloxane e.g., polydimethylsiloxane particles can be obtained using condensation or addition cure methods. Preparation preferably involves the reaction of a vinyl dimethyl terminated polydimethylsiloxane having a number average molecular weight of from about 300 to about 20,000, and either a polymethylhydrosiloxane or a methyl hydro, dimethylsiloxane copolymer, having a number average molecular weight of from about 110 to about 3,000; also as a matter of preference, the ratio of hydride to vinyl groups is from about 1:1 to about 2:1.

The silicone elastomer particles particularly can be prepared in accordance with the procedures set forth in U.S. Pat. No. 6,281,279; accordingly, the silicone elastomer particles as disclosed in U.S. Pat. No. 6,281,279 can be used. This patent is incorporated herein in its entirety, by reference thereto.

Commercially available silicone particulates that are suitable for the invention include X-52-854, X-52-875, KMP597, and KMP598, from Shin-Etsu Silicones of America, Inc., Akron, Ohio.

Addition cure silicone elastomers typically employ a platinum catalyst; condensation cure silicone elastomers, a tin catalyst. Tin catalysts will poison platinum catalysts, but the reverse is not true. Accordingly, as to employing an already cured second elastomer with a curable first polymer, an addition cure silicone second elastomer may be used with a condensation cure silicone first elastomer, but a condensation cure silicone second elastomer may not be used with an addition cure silicone first elastomer unless provision has been made to prevent poisoning of the addition cure catalyst by the condensation cure catalyst.

The discontinuous phase domains preferably have a surface energy of about 35 dynes/cm or less. As a matter of particular preference, the second elastomer has a surface energy of about 30 dynes/cm or less.

For polyorganosiloxane discontinuous domains, the polyorganosiloxane preferably has a molecular weight between crosslinks of from about 300 to about 10,000—particularly in the case of polydimethylsiloxane discontinuous domains, and particularly in the case of polyorganosiloxane, especially polydimethylsiloxane, particles or particulate, such as preformed particles or particulate.

The discontinuous phase domains preferably have a mean diameter particularly in the case of the particulate, a mean particle diameter—of from about 0.1 microns, to about 100 microns. Further, the discontinuous phase domains can have a mean diameter—particularly in the case of the particulate, a mean particle diameter of at least about 1 micron, or at least about 2 microns, or at least about 5 microns, or at least about 8 microns. In a particularly preferred embodiment, the discontinuous phase domain mean diameter particularly in the case of the particulate, the mean particle diameter is from about 8 microns to about 60 microns.

The second elastomer discontinuous phase domains can comprise from about 5 percent by volume to about 70 percent by volume, of the fusing surface layer. Further, the second elastomer discontinuous phase domains can comprise up to about 50 parts up to about 150 parts, per 100 parts by weight of the first elastomer continuous phase.

In a particularly preferred embodiment, preformed polydimethylsiloxane particulate is employed as the second elastomer, together with a condensation curable silicone as the first elastomer.

The problems of toner contamination and of compatibility with respect to high energy reinforcing fillers, and particularly inorganic fillers, and PTFE fillers have been noted. As to this matter, it is preferred, notwithstanding the presence therein of the second elastomer discontinuous phase domains, that fillers including the indicated PTFE fillers, and high energy reinforcing fillers, and particularly inorganic fillers be absent, or essentially absent from the fusing surface layer. And in this regard though second elastomer discontinuous phase domains indeed are dispersed through the first elastomer continuous phase it is preferred that there be no fillers or essentially no fillers, dispersed through the first elastomer continuous phase.

However, though this absence of fillers is preferred, nevertheless it is not required. Accordingly, fillers including the indicated PTFE fillers, and high energy reinforcing fillers, and particularly inorganic fillers—indeed may be included in the fusing surface layer. And particularly, there may be fillers dispersed through the first elastomer continuous phase.

The fusing surface layer therefore may further include—in addition to the second elastomer discontinuous phase domains one or more fillers dispersed through the first elastomer continuous phase. Different fillers may be used for such purposes as conducting heat, improving toner offset and release properties of the fusing surface layer, controlling material properties such as wear resistance and surface roughness, modifying hardness, and imparting other characteristics, such as desired mechanical properties, to the fusing surface layer; among the fillers which may be included are reinforcing fillers even though, as indicated, it is preferred that these in particular not be used.

Fillers that are suitable include inorganic fillers, such as $SnO_2$, SiC, CuO, ZnO, $Al_2O_3$, FeO, $Fe_2O_3$, WC, BN, $TiO_2$, and $SiO_2$. Suitable $SiO_2$ includes amorphous silica, such as precipitated silica and fumed silica, as well as crystalline silica (quartz).

Thermally conductive fillers may be employed. Suitable thermally conductive fillers include the indicated $SnO_2$, SiC, CuO, ZnO, FeO, $Fe_2O_3$, BN, crystalline $SiO_2$, $TiO_2$, and $Al_2O_3$. Preferred thermally conductive fillers are $Al_2O_3$ and $Fe_2O_3$.

Further fillers that are suitable include plastic fillers. The plastics are understood as including non-crosslinked plastics, and also as including resins, particularly inelastic resins, and crosslinked resins. Fluoroplastics are particularly preferred, as are fluoro-resins, or nonelastomeric fluorocarbons. Fluororesins that are suitable include polytetrafluoroethylenes (PTFE), and fluorinated ethylene propylenes (FEP), including copolymers of tetrafluoroethylene and hexafluoropropylene, as well as copolymers of tetrafluoroethylene and ethylene, and copolymers of tetrafluoroethylene and perfluoroalkyl vinyl ether (PFA). Preferably the plastics, and particularly the fluororesins, have a number average molecular weight of from about 1,000 to 1,000,000.

These one or more fillers may be present i.e., dispersed through the first elastomer continuous phase—in amounts and proportions, and sizes, as are generally known or as can be determined without undue experimentation by those of ordinary skill in the art. Where present, filler as indicated thermally conductive filler in particular preferably comprises not more than about 45 percent by volume, more preferably not more than about 35 percent by volume, still more preferably not more than about 30 percent by volume of the fusing surface layer. Still more preferably, filler as indicated comprises from about 5 percent by volume, or from about 10 percent by volume, to about 45 percent by volume, of the fusing surface layer.

The one or more fillers may be in one or more of any suitable shapes irregular, as well as in the form of spheroids, platelets, flakes, powders, ovoids, needles, fibers, and the like. For thermally conductive filler, and particularly where such filler is used and internal heating is employed, an irregular shape is more preferred, as are spherical particles and platelets, so as to maximize the heat conducting effect of the filler particles; fibers, needles, and otherwise elongated shapes are less preferred here, unless they are advantageously oriented, because in certain alignments they are less effective for properly conducting heat.

In this regard, elongated thermally conductive particles are more efficient for conducting heat in the proper direction if they are at right angles to the fuser base radially aligned, if the fuser base is a cylindrical core, belt on rollers, or a core-mounted plate, but less efficient if they are positioned parallel to the core axially aligned, if the fuser base is a core, a belt, or is core mounted as indicated. Accordingly, to maximize heat conducting properties where elongated thermally conductive particles are employed, perpendicular (radial) positioning is preferred, while parallel (axial) alignment may be employed but is not preferred.

Particularly as to sizes, preferably these one or more fillers have a mean particle diameter of from about 0.1 microns, or about 0.2 microns, to about 20 microns, or about 50 microns, or about 80 microns.

As with the first elastomer, it is preferred that filler be absent, or essentially or at least essentially absent, from the second elastomer. However, here too the filler absence though preferred, nevertheless it is not required.

The second elastomer accordingly may contain one or more fillers. Filler incorporated in the second elastomer preferably has a mean particle diameter that is not more than about 25 percent of the mean diameter of the second elastomer domains.

Fillers suitable for the first elastomer are also suitable for the second elastomer. Where present, filler preferably comprises not more than about 40 percent by volume, or not more than about 50 percent by volume of the second elastomer discontinuous phase domains. Still more preferably, filler as indicated comprises from about 0 percent by volume, or from about 5 percent by volume, to about 40 percent by volume, or to about 50 percent by volume, of the second elastomer discontinuous phase domains. Also as a matter of preference, the discontinuous phase domains comprise less than about 20 percent by volume filler, more preferably less than about 10 percent by volume filler.

In a particularly preferred embodiment, an addition cure polydimethylsiloxane particulate from which filler is absent, or essentially absent, or at least essentially absent, and which has a mean particle diameter of about 40 microns, and a modulus of $5.3\times10^6$ Pa at fuser operating conditions, or at the temperature of the fusing process, or at the fusing temperature, is employed as the second elastomer, together with a condensation cure polydimethylsiloxane first elastomer having a modulus of $1\times10^6$ Pa at fuser operating conditions, or at the temperature of the fusing process, or at the fusing temperature, and with $Fe_2O_3$ filler also dispersed through the first elastomer.

Yet other additives and adjuvants also may be included in the fusing surface layer, as long as they do not affect the integrity thereof, or significantly interfere with an activity intended to occur in the layer—such as elastomer crosslinking. These further additives and adjuvants, where present, are provided in amounts and proportions as are generally known or as can be determined without undue experimentation by those of ordinary skill in the art. Suitable examples include crosslinking agents, processing aids, accelerators, polymerization initiators, and coloring agents.

Particularly with respect to the toner fusing system and the toner fusing process—and correspondingly the fuser member—of the invention, the fuser base may be any of those as are known in the art. As a suitable embodiment, the fuser base may be a core in the form of a cylinder or a cylindrical roller, particularly a hollow cylindrical roller. In this embodiment the fuser base may be made of any suitable metal, such as aluminum, anodized aluminum, steel, nickel, copper, and the like. Also appropriate are ceramic materials and polymeric materials, such as rigid thermoplastics, and thermoset resins with or without fiber enforcement. Preferably the roller is an aluminum tube or a flame sprayed aluminum coated steel tube.

Alternatively, the fuser base may be a plate. Materials suitable for the core may also be used for the plate.

One embodiment of a fuser base in the plate form is a curved plate mounted on a larger cylindrical roller that is, larger than a cylindrical roller which itself is employed as a fuser core. Being curved, the plate has the shape of a portion of a cylinder. Additionally, the plate can be mounted on the cylindrical roller, so that the plate can be replaced without also requiring replacement of the roller. In this embodiment, the properties discussed herein with reference to the fuser base pertain only to the portion of the cylindrical roller occupied by the attached plate; the rest of this roller is not involved in the fusing of toner to substrate.

In another alternative, the fuser base may be a belt, particularly an endless flexible belt. A thin belt made of a suitable metal, such as those indicated for the core and plate forms; the belt may also be made of a polyamide or a polyimide, particularly a heat resistant polyamide or polyimide. A polyimide material appropriate for the belt is commercially available under the trademark Kapton, from DuPont High Performance Films, Circleville, Ohio.

Preferably the belt is mounted on rollers, which can be cores of the type as discussed herein. As a matter of preference two rollers are utilized with the belt, each of these two rollers defining a different one of the curves around which the belt passes.

A support member for the fusing system and process may be any of those as are known in the art; particularly, it can be a backup roller, also referred to as a pressure roller. The support member can be in the form of a roller, plate, or belt, in the same manner as is suitable for the fuser base; particularly, cores suitable for the fuser member may also be used for the support member. Where the support member is a belt, preferably it is mounted on rollers, in the same manner as—for the fuser base in the form of a belt.

In any of the indicated forms, the support member may have mounted thereon a cushion for forming the nip with the fuser member. Suitable cushion materials include those having at least some degree of temperature resistance, such as silicone and EPDM elastomers. In the absence of yet a further layer in turn being mounted on the cushion, this cushion also serves to contact the substrate, and accordingly to cooperate with the fuser member.

Alternatively or in addition to the cushion, the support member may have mounted thereon a thin fluoroplastic surface layer, such as a Teflon or PFA layer, overlaying the surface that cooperates with the fuser member. Where both the cushion and the thin fluoroplastic surface layer are present on the support member, the cushion is situated between the support member and the surface layer.

Preferably the fuser base is in the form of a cylindrical roller, with the fuser member correspondingly in the form of a roller specifically, a fuser roller. Also as a matter of preference, the support member comprises a backup roller.

Further in the toner fusing system and process of the invention, internal heating and/or external heating may be employed. Heating means as are known in the art, such as appropriate heating members, are suitable. Preferably, the means of providing heat for fusing toner and substrate comprise the heating of the fuser member by one or more external and/or internal heating sources by one or more heating members —and transmission of this heat from the fuser member to the toner, or to both toner and substrate preferably by contact.

As used herein with reference to heating, the terms "external" and "internal" pertain to positioning with respect to the fuser base. In this regard, "external" indicates location outside of the fuser base, and "internal" means residence within the fuser base.

Correspondingly, an external heating member is outside the fuser member, and therefore outside the fuser base. It thusly provides heat to the fusing surface layer from outside the fuser member.

Consistent with the foregoing, an internal heating member is inside the fuser base, and correspondingly inside the fuser member. It accordingly provides heat to the fusing surface layer from within the fuser member.

Further as to the matter of heating, the term "primary" refers to providing more than 50%, and up to and including 100%, of the heat energy employed for fusing toner to the substrate on which it resides. Correspondingly, the term "secondary" refers to providing less than 50% of the heat energy.

Where there are one or more materials and/or layers, including one or more cushion layers, interposed between the fuser base and the fusing surface layer, they may be those as are known in the art. Where there is at least one cushion layer, the at least one cushion layer can include one or more thermally conductive cushion layers and/or one or more thermally nonconductive cushion layers. Generally, the thickness of the at least one cushion layer is about 20 millimeters or less, preferably from about 1 to about 10 millimeters.

Among the materials which can be used for the cushion layer are suitable silicone elastomers, such as appropriate thermally conductive silicone elastomers and thermally nonconductive silicone elastomers. Addition cure, condensation cure, and peroxide cure silicone elastomers can all be used, with addition cure silicone elastomers and condensation cure silicone elastomers being preferred.

Further, silicone elastomers formulated as liquid injection moldable (LIM), high temperature vulcanizate (HTV), and RTV silicone elastomers can be used. RTV and LIM silicones are preferred. Two particular silicone elastomers which may be used are Silastic™-J silicone and EC4952 silicone.

In a process that may be used for application of the cushion layer, the fuser base optionally can first be degreased and surface roughened. These functions may be accomplished by grit blasting. Except as discussed otherwise herein, the fuser base surface, whether or not initially degreased and roughened, is primed with conventional primer, such as Dow™ 1200 RTV Prime Coat primer, from Dow Corning Corporation, and material for forming a cushion is subsequently applied thereto.

To form a silicone cushion layer, silicone elastomer is molded, particularly by injection, or extruded or cast onto the fuser base to the desired thickness. Curing is then effected. For a RTV silicone, this is accomplished by allowing it to sit at room temperature.

After curing, conventionally the silicone layer is subjected to a post cure, which improves compression set resistance. Typically a post cure is conducted at a temperature of around 150-240° C., for a period of about 1-48 hours.

Each silicone cushion layer is subjected to cure, and preferably also to post cure, before application of the next layer, except possibly in the case of the last silicone cushion layer to be laid down. Specifically, for preparation of the fusing surface layer, the curable first polymer containing the curable second polymer or cured second elastomer domains, as well as any filler, additives, adjuvants, or other materials being employed is laid down on the indicated last applied cushion layer.

If heating is required for the curing of this fusing surface layer material e.g., for curing the curable first polymer and/or the curable second polymer if such is employed then there is no post cure of the last applied silicone cushion layer prior to application of the fusing surface layer material; rather, the heat curing of the fusing surface layer serves as the post cure for the silicone cushion layer on which it is deposited.

Delaying the post cure of the last cushion layer in this manner allows maximum adhesion between the cushion and the fusing surface layer to develop. However, if curing of the fusing surface layer is affected without heat, then the last applied silicone cushion layer is subjected to post cure before the fusing surface layer material is laid down.

Before the fusing surface layer material is applied, the cushion material can be ground to a desired profile, depending upon the paper handling concerns to be addressed. For instance, a cylinder shape, or a crown, or barrel, or bow tie, or hourglass profile may be provided.

As discussed, addition cure silicone elastomers typically employ a platinum catalyst, while condensation cure silicone elastomers typically employ a tin catalyst. Also as discussed, tin catalysts will poison platinum catalysts, but the reverse is not true. Accordingly, where sequential addition and condensation cure silicone elastomer layers are employed, a condensation cure layer can be applied onto an addition cure layer, but not vice versa unless, as with using an already cured condensation cure silicone second elastomer with a curable addition cure silicone first polymer in preparing the fusing surface layer, provision has been made to prevent poisoning of the addition cure catalyst by the condensation cure catalyst.

For preparation of the fusing surface layer, the fusing surface layer material is laid down either directly on the fuser base, or on interposing material as indicated. This material is applied by any suitable means, as are known in the art, to form a layer of the requisite thickness, and then curing is effected also by any suitable means, as are known in the art. The first polymer thusly is cured to provide the first elastomer; the second elastomer, if still in curable form, likewise is cured.

There are factors to consider as to preferred maximum fusing surface layer thicknesses in various circumstances. For instance, if internal heating is employed in the fusing process, then the fusing surface layer must not be so thick as to impede heat transfer impermissibly, and thereby cause the base or core temperature to become excessive. Accordingly, even where the fusing surface layer is directly adjacent to the base, the layer preferably is not thicker than about 2,500 microns.

Where external heating is employed and there is no internal heating, then the fusing surface layer can be thicker. In these circumstances the fusing surface layer can be as thick as about 15,000 microns, or even thicker; theoretically there is no thickness upper limit, subject to considerations of cost and processing limitations.

Minimum thickness is also a matter to be considered. As one point, insufficient thickness of the fusing surface layer results in problems with respect to wearability. Wear can be caused by substrate edges, especially where the substrate is paper, and also can result from the scrubbing of the fusing surface layer by the substrate. Wear by substrate edges is a particular problem where a variety of sizes of substrates are used, because the edge of a smaller substrate can impart a surface defect or groove that may be visible within the toner receiving region of a larger substrate overlaying the defect or groove.

Edge wear defects usually are not visible until the depth of the defect reaches about 3 to 8 mils (about 36 to 203 microns) in depth. If the fusing surface layer is thinner than the depth of the defect, then the underlying fuser base or cushion will be exposed, resulting in fuser member failure. Failure will also result if scrubbing by the substrate penetrates the fusing surface layer.

The fusing surface layer therefore preferably has a thickness of at least about 75 microns, more preferably of at least about 100 microns, and still more preferably of at least about 250 microns. In a preferred embodiment, the fusing surface layer has a thickness of from about 75 microns to about 2,500 microns.

The fuser member, in a preferred embodiment, comprises a fusing surface layer having a thickness of from about 75 microns to about 2,500 microns, and at least one cushion layer having a total cushion thickness of from about 1,000 to about 15,000 microns. In a more preferred embodiment, the fuser member comprises a fusing surface layer having a thickness of from about 75 microns to about 2,000 microns, and at least one cushion layer having a total cushion thickness of from about 2,000 to about 10,000 microns. In a still more preferred embodiment, the fuser member comprises a fusing surface layer having a thickness of from about 75 microns to about 1,300 microns, and at least one cushion layer having a total thickness of from about 2,200 to about 7,000 microns.

In an embodiment of the invention, the primary heating for the fuser member is external heating, and the fuser member has a single elastomer layer—comprising silicone elastomer domains dispersed through a silicone elastomer continuous phase acting both as the fusing surface layer and as a cushion layer. This layer has a thickness of from about 200 mils (about 5,000 microns) to about 400 mils (about 10,000 microns).

In another embodiment of the invention, the primary heating for the fuser member instead is internal heating, but here too the fuser member has a single elastomer layer—comprising silicone elastomer domains dispersed through a silicone elastomer continuous phase—acting both as the fusing surface layer and as a cushion layer. Here the single layer has a thickness of from about 250 microns to about 2,500 microns).

In yet a third particular embodiment of the invention, preferably the primary heating for the fuser member is external heating, and the fuser member has two elastomer cushion layers, one overlying the other, with a total cushion thickness of from about 75 mils (about 2,000 microns) to about 400 mils (about 10,000 microns). The underlying layer in this embodiment acts as a base cushion layer; it does not have thermally conductive filler added thereto, and is a thermally nonconductive or low thermal conductivity material, and yet additionally also preferably comprises Silastic™-J silicone, as described in the Examples which follow. The overlying surface layer acts both as the fusing surface layer and as a cushion layer; it comprises silicone elastomer domains dispersed through a silicone elastomer continuous phase, and preferably further comprises, dispersed through the silicone elastomer continuous phase, from about 0 percent by volume to about 35 percent by volume thermally conductive filler. Of the indicated total cushion thickness, the base cushion layer underneath is relatively thicker, and the overlying surface layer is relatively thinner. In this regard, the surface layer has a thickness of from about 10 mils to about 30 mils (from about 250 microns to about 760 microns), with the underlying layer accounting for the remainder.

The fuser member of the invention can be used in toner fusing systems and processes where, during operation, release agent is applied to the fusing surface layer so that this agent contacts toner on the substrate, and can also contact the substrate, during the operation of the fuser member. Particularly where the fuser base is a cylindrical roller or an endless belt, the release agent is applied, while the base is rotating or the belt is running, upstream of the contact area between fuser member and substrate toner.

If employed, release agent preferably is applied so as to form a film on the fusing surface layer. As a matter of particular preference, the release agent is applied so as to form a film that completely covers the fusing surface layer. Also as a matter of preference, during operation of the system the release agent is applied continuously to the fusing surface layer.

Release agents are intended to prohibit, or at least lessen, offset of toner from the substrate to the fusing surface layer. In performing this function, the release agent can form, or participate in the formation of, a barrier or film that releases the toner. Thereby the toner is inhibited in its contacting of, or even prevented from contacting, the actual fusing surface layer, or at least the fluoroelastomer thereof.

The release agent can be a fluid, such as an oil or a liquid, and is preferably an oil. It can be a solid or a liquid at ambient temperature, and a fluid at operating temperatures. Preferred release agents are those that cause minimal swell of the fuser member elastomer continuous and discontinuous phases.

Also as a matter of preference, the release agent is a polymeric release agent; it can be, for instance, a silicone a polyorganosiloxane, and particularly a polydimethylsiloxane. As a matter of particular preference, the release agent is a silicone or polyorganosiloxane, or polydimethylsiloxane, oil.

As a matter of preference, the silicone, or polyorganosiloxane, or polydimethylsiloxane, release agents have a viscosity, at ambient temperature, greater than about 5,000 cSt, more preferably greater than about 9,000 cSt, still more preferably from about 10,000 cSt to about 100,000 cSt, and still more preferably from about 20,000 cSt to about 100,000 cSt.

Suitable release agents are those disclosed in U.S. Pat. Nos. 5,824,416, 4,515,884, and 5,780,545. These three patents are incorporated herein in their entireties, by reference thereto.

Commercially available polydimethylsiloxanes which may be used as release agents are the DC200® polydimethylsiloxanes, from Dow Coming Corporation.

Also suitable are hydrocarbon release agents, particularly polyethylene release agents. Polyethylene release agents which may be used include those that are solid at 25° C., but liquid at operating temperatures, particularly fusing process temperatures. Preferred polyethylenes are those having a molecular weight of from about 300 to about 10,000.

Yet additionally suitable are perfluoropolyether release agents. Commercially available perfluoropolyethers that are suitable for use as release agents include the following: Krytox, from E.I. du Pont de Nemours and Company, Deepwater, N.J.; Fomblin® Y45, YR, and YPL1500, from Ausimont USA, Inc., Thorofare, N.J.; and Galden® HT230, HT250, HT270, also from Ausimont USA, Inc.

Further, release agents which may be used include polymeric release agents having functional groups. Appropriate polymeric release agents with functional groups include those that may be found as liquids or solids at room temperature, but are fluid at operating temperatures.

Particular functional group polymeric release agents which may be used include those disclosed in U.S. Pat. Nos. 4,011,362, 4,046,795, and 5,781,840; these patents also are incorporated herein in their entireties, by reference thereto. Still further release agents which may be used are the mercapto-functional polyorganosiloxanes disclosed in U.S. Pat. No. 4,029,827, and the polymeric release agents having functional groups such as carboxy, hydroxy, epoxy, amino, isocyanate, thioether, and mercaptofunctional groups, as disclosed in U.S. Pat. Nos. 4,101,686 and 4,185,140;

yet additionally these patents are incorporated herein in their entireties, by reference thereto.

The more preferred release agents with functional groups are the mercaptofunctional polyorganosiloxane release agents and the aminofunctional polyorganosiloxane release agents. Particularly preferred are the release agents, including mercaptofunctional polyorganosiloxane release agents, comprising monomercaptofunctional polyorganosiloxanes, or polyorganosiloxanes having one mercaptofunctional group per molecule or polymer chain. Also particularly preferred are release agents, including aminofunctional polyorganosiloxane release agents, comprising monoaminofunctional polyorganosiloxanes, or polyorganosiloxanes having one amino functional group per molecule or polymer chain. In this regard, the release agents disclosed in U.S. Pat. Nos. 5,531,813 and 6,011,946 may be used; these patents are incorporated herein in their entireties, by reference thereto.

Further with regard to the functional agents, one point to consider is that because of their expense usually they are diluted with nonfunctional polyorganosiloxanes, particularly nonfunctional polydimethylsiloxanes. Another point is that for obtaining good release activity with a functional release agent, monofunctionality is preferred, so that the molecule cannot react both with toner and with the fusing surface layer, and thereby serve as a toner/fuser member adhesive.

Therefore, ideally the monofunctional molecule would comprise a substantial portion of the functional agent.

In fact, the functional polyorganosiloxane preferably comprises as great a proportion of the monofunctional moiety as is practically possible. As a matter of particular preference, the functional polyorganosiloxane has a sufficient monofunctional proportion so as not to act as the indicated adhesive.

Accordingly, a preferred release agent composition comprises a blend of nonfunctional polyorganosiloxane, particularly nonfunctional polydimethylsiloxane, with aminofunctional polyorganosiloxane, and the aminofunctional polyorganosiloxane comprises monoaminofunctional polyorgano-siloxane. Another preferred release agent composition comprises a blend of nonfunctional polyorganosiloxane, particularly nonfunctional polydimethylsiloxane, with mercaptofunctional polyorganosiloxane, and the mercapto-functional polyorganosiloxane comprises monomercaptofunctional polyorganosiloxane.

The release agent may be applied to the fuser member by any suitable applicator, including sump and delivery roller, jet sprayer, etc. Those means as disclosed in U.S. Pat. Nos. 5,017,432 and 4,257,699 may be employed; the latter of these two patents is incorporated herein in its entirety, by reference thereto. Preferably the present invention employs a rotating wick oiler or a donor roller oiler.

A rotating wick oiler comprises a storage compartment for the release agent and a wick for extending into this compartment. During operation of the toner fusing system of the invention, the wick is situated so as to be in contact with the stored release agent and also with the fusing surface layer of the fuser member; the wick picks up release agent and transfers it to the fuser member.

A donor roller oiler includes two rollers and a metering blade, which can be a rubber, plastic, or metal blade. One roller meters the oil in conjunction with the blade, and the other transfers the oil to the fuser roller. This type of oiler is common in the art, and is frequently used with fuser members having fluoroelastomer fusing surface layers.

The release agent is applied to the substrate, particularly in the case of paper, preferably at a rate of from about 0.1 to about 20 microliters, more preferably at a rate of about 1.0 to about 8 microliters, per 8½" by 11" copy. The applicator accordingly is adjusted to apply the release agent at this rate.

A toner fusing system of the invention is shown in FIG. 1. Multilayered fuser roller 10 comprises, in sequential order, a fuser base 11, in the form of a hollow cylindrical roller, as well as a cushion layer 12 and a fusing surface layer 13. Fusing surface layer 13 has silicone elastomer particles (not depicted in FIG. 1) dispersed therein. Internal heating member 14, an optional element in the invention, is disposed in the hollow portion of fuser base 11.

External heating members 15 and 16 are in the form of hollow cylindrical rollers; their rotational directions, and the rotational directions of all the other rotating elements, is shown by their respective arrows. The rotational directions as depicted can all be reversed.

External heating members 15 and 16 are heated by respective heating lamps 17. These two contact heating members are spaced apart by a distance less than the diameter of fuser member 10, which is in contact with both. Contact heating members 15 and 16 transfer heat to fuser member 10 by their contact with fusing surface layer 13.

Rotating wick oiler 18 applies release agent to fusing surface layer 13.

Support member 19, in the form of a backup roller, cooperates with fuser member 10 to form fusing nip or contact arc 20. Copy paper or other substrate 21, carrying unfused toner images 22, passes through fusing nip 20 so that toner images 22 are contacted by fusing surface layer 13. Support member 19 and fuser member 10 act together to apply pressure to the paper 21 and toner 22, and fuser member 10 also provides heat, with the heat and pressure serving to fuse toner 22 to the paper 21.

Dispensing roller 26 incrementally feeds cleaning web 24 over advance roller 25, to be rolled up onto collecting roller 23. In passing along roller 25, web 24 contacts and cleans contact heating members 15 and 16.

Cleaning web 24 is a polyamide material. A polyamide web which may be employed for this purpose is commercially available under the trademark Nomex® from BMP of America, Medina, N.Y. Any other suitable cleaning material may be employed instead.

In place of the indicated cleaning assembly, any other means or apparatus appropriate for cleaning the contact heating members may be employed. Alternatively, the contact heating members can be provided with a nonstick coating. This coating can be a fluoroplastic, and it can include a heat conducting filler. Where the contact heating members have a nonstick coating the means for cleaning these members can be omitted.

Figure 2:
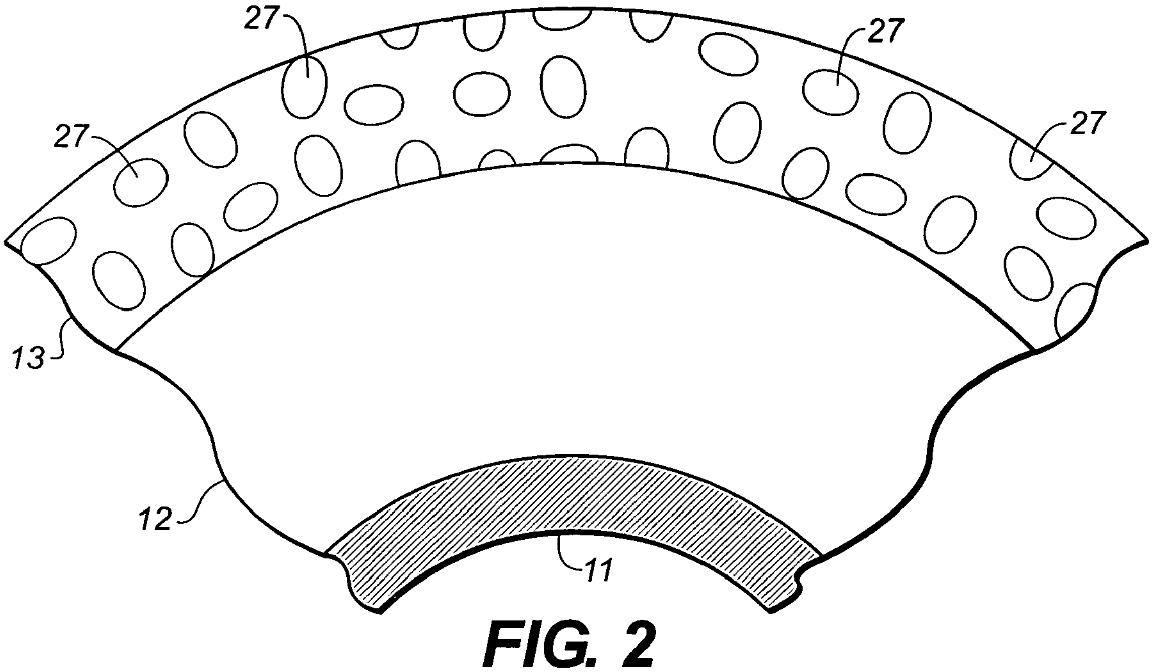
FIG. 2 is a schematic representation, and an enlarged fragmentary sectional view, of an embodiment of the fuser member of the invention.
Figure 3:
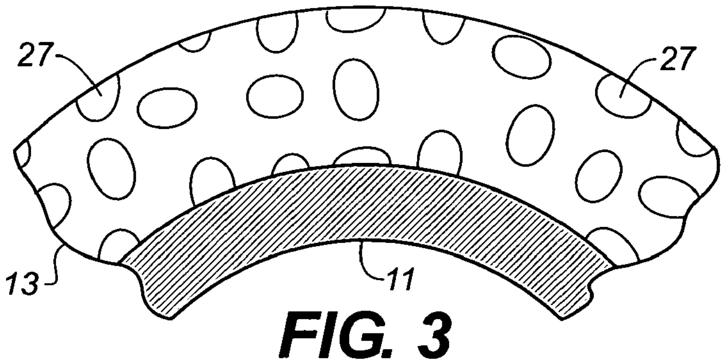
FIG. 3 is a schematic representation, and an enlarged fragmentary sectional view, of another embodiment of the fuser member of the invention.

FIG. 2 shows a fragmentary view of an embodiment of fuser member 10, magnified to show the multiple layers in greater detail. Silicone elastomer particles 27 are distributed through fusing surface layer 13. FIG. 3 shows a fragmentary view of another embodiment of fuser member 10, also magnified to show greater detail. In this embodiment there is no cushion, and fusing surface layer 13 resides directly on fuser base 11.

The invention is illustrated by the following procedures; these are provided for the purpose of representation, and are not to be construed as limiting the scope of the invention. Unless stated otherwise, all percentages, parts, etc. are by weight.

EXPERIMENTAL PROCEDURES

Materials Employed in the Procedures

Dow™ 1200 RTV Prime Coat primer, from Dow Corning Corporation, Midland, Mich. A metal alkoxide type primer containing light aliphatic petroleum naptha (85 weight percent), tetra(2-methoxy-ethoxy)silane (5 weight percent), tetrapropyl orthosilicate (5 weight percent), and tetrabutyl titanate (5 weight percent)

Silastic™-J silicone rubber

LS4340-103 silicone rubber

EC4952, also know as Stycast®, silicone rubber 60,000 centistoke DC200® polydimethylsiloxane oil Catalyst 50, from Emerson & Cuming ICI Preformed particulate silicone rubber powders: KMP598, approx. 13 microns mean particle diameter; X-52-854, approx. 0.8 microns mean particle diameter; X-52-875, approx. 40 microns mean particle diameter

EXAMPLE 1

A hollow cylindrical aluminum fuser core was cleaned and dried. The core was then primed with a uniform coat of Dow™ 1200 RTV Prime Coat primer. Silastic™-J silicone rubber parts A and B were mixed, injection molded onto the primed core, and cured at 40° C. The curing at this temperature was conducted for a period of time long enough to provide sufficient green strength so that the roller could be demolded without damage thereto.

After this treatment, the roller was removed from the mold, and baked in an oven. This baking was conducted at an elevated temperature, to substantially complete the curing of the elastomer.

When the baking was completed, the roller was taken from the oven and air cooled. After air cooling, the roller had a base cushion layer of cured Silastic™-J silicone rubber, with a thickness of approximately 180 mils (0.180 inches) and a Shore A durometer, measured as a slab, of approximately 63.

LS4340-103 polydimethylsiloxane rubber, with no alumina filler incorporated therein, was blended with Catalyst 50, at a ratio of 0.625 parts Catalyst 50 to 100 parts LS4340-103 elastomer. A portion of this blend was degassed and blade coated directly onto the cured Silastic™-J silicone rubber layer.

The roller was then oven cured, to form an LS4340-103 second, fusing surface layer over the first, Silastic™-J cushion layer. The LS4340-103 was ground, to give the two elastomer layers combined i.e., the Silastic™-J layer and the LS4340-103 layer together—a final total thickness of about 200 mils (0.200 inches).

Another portion of the LS4340-103/Catalyst 50 blend was injection molded into a mold cavity, and cured in a convection oven at 60° C. for 24 hours, to obtain a cured silicone slab measuring 0.25 inches X 3 inches X 5 inches.

This slab was demolded, then post cured by ramping the temperature from room temperature to 205° C. over a 2 hour period, and holding the temperature at 205° C. for 4 hours. One 0.59 inch wide strip was cut from the post cured slab as a sample for surface abrasion testing, and another strip was cut as a sample for swell measurement.

The sample for surface abrasion testing was placed on a heated stage, and maintained at 175° C. during the test. Surface abrasion was performed using a Norman Abrasion Wear Tester, Norman Tool, Inc., Evansville, Ind., with a 0.69 inch wide strip of test paper for wearing the sample. The test paper was pressed in contact with the sample, and cyclically dragged over the sample by a load arm bearing a 755 gram load, and so applying a total weight of 894 grams to the sample for 360 wear cycles, thereby producing abrasive wear in the form of a wear track.

The depth of the wear track was measured with a Surfanalyzer® System 4000, from Mahr Federal Inc., Providence, R.I., using a conical stylus under a 250 mg load. The wear rate was calculated in mils of wear track depth per 100 cycles, and the result is shown in Table 1.

The longest dimension of the sample to be tested for swell was measured. The sample then was placed in a test tube, and covered with 60,000 centistoke DC200® polydimethylsiloxane oil, in an amount sufficient to cover the sample completely, even in its swollen state.

The test tube containing the sample in oil was placed in an oven and heated at 175° C. for seven days. At the end of this period the test tube was removed from the oven; the sample was cooled, and removed from the oil.

The longest dimension of the sample again was measured, to determine the increase of this dimension. To calculate swell level, this increase in length was divided by the original length for this dimension. As with wear rate, swell level also is set forth in Table 1.

EXAMPLE 2

A fuser roller, a cured slab, and test samples were prepared in substantially the same manner as those of Example 1, except that EC4952 silicone rubber also was included in the blend used to prepare the fusing surface layer and the cured slab, with the proportion of elastomers and catalyst being 0.275 parts Catalyst 50, 47.5 parts LS4340-103 elastomer, and 100 parts EC4952 elastomer. Abrasion and swell tests were conducted in the same manner as with Example 1, and the results of these tests also are shown in Table 1.

EXAMPLE 3

A fuser roller, a cured slab, and test samples were prepared in substantially the same manner as those of Example 1, except that EC4952 silicone rubber also was included in the blend used to prepare the fusing surface layer and the cured slab, with the proportion of elastomers and catalyst being 0.364 parts Catalyst 50, 27.5 parts LS4340-103 elastomer, and 100 parts EC4952 elastomer. Abrasion and swell tests were conducted in the same manner as with Example 1, and the results of these tests also are shown in Table 1.

Additionally, an axial section, with a width greater than 0.59 inch, was cut from the completed (i.e., oven cured and ground) fuser roller, then trimmed to a strip 0.59 inch wide, and shaved to a uniform thickness of 1500 microns. Abrasion testing was conducted with this strip in the same manner as with the strip that was cut from the post cured slab, and the result of this test also is shown in Table 1.

As can be seen in Table 1, the fuser roller sample wear rate was greater than the cured slab strip wear rate. The reason for this difference was the smaller contact area between the test paper and the curved surface of the fuser roller sample.

EXAMPLE 4

Two fuser rollers, a cured slab, and test samples were prepared in substantially the same manner as the fuser roller, cured slab, and test samples of Example 3, except for the following differences: the blend used to prepare the fusing surface layers and the cured slab was made up of 0.25 parts Catalyst 50 and 100 parts EC4952 elastomer; further, only one of the two rollers was used in the same manner as the roller of Example 3, for preparing a roller abrasion testing strip; the other of these two rollers was left unaltered. Abrasion and swell tests were conducted in the same manner as with Example 3, and the results of these tests also are shown in Table 3. As with Example 3, the fuser roller sample wear rate was greater than the cured slab strip wear rate, and for the same reason the smaller contact area between the test paper and the curved surface of the fuser roller sample.

EXAMPLE 5

A fuser roller, a cured slab, and test samples were prepared in substantially the same manner as those of Example 1, except for the following differences. X-52-854 silicone particulate also was included in the blend used to prepare the fusing surface layer and the cured slab, with the proportion of elastomers and catalyst being 0.375 parts Catalyst 50, 75 parts LS4340-103 elastomer, and 25 parts X-52-854 silicone particulate. Further, the portion of this blend used to prepare the fusing surface layer was first milled on a three roll mill with a 2 mil gap until uniform, prior to being degassed and blade coated onto the cushion layer. Abrasion and swell tests were conducted in the same manner as with Example 1, and the results of these tests also are shown in Table 1.

EXAMPLE 6

A fuser roller, a cured slab, and test samples were prepared in substantially the same manner as those of Example 5, except that the blend used to prepare the fusing surface layer and the cured slab was made up of 0.25 parts Catalyst 50, 50 parts LS4340-103 elastomer, and 50 parts X-52-854 silicone particulate.

Abrasion and swell tests were conducted in the same manner as with Example 5, and the results of these tests also are shown in Table 1.

EXAMPLE 7

A fuser roller, a cured slab, and test samples were prepared in substantially the same manner as those of Example 5, except that the blend used to prepare the fusing surface layer and the cured slab was made up of 0.375 parts Catalyst 50, 75 parts LS4340-103 elastomer, and 25 parts KMP598 silicone particulate. Abrasion and swell tests were conducted in the same manner as with Example 5, and the results of these tests also are shown in Table 1.

EXAMPLE 8

A fuser roller, a cured slab, and test samples were prepared in substantially the same manner as those of Example 5, except that the blend used to prepare the fusing surface layer and the cured slab was made up of 0.25 parts Catalyst 50, 50 parts LS4340-103 elastomer, and 50 parts KMP598 silicone particulate.

Abrasion and swell tests were conducted in the same manner as with Example 5, and the results of these tests also are shown in Table 1.

EXAMPLE 9

Two fuser rollers, a cured slab, and test samples were prepared in substantially the same manner as the fuser roller, cured slab, and test samples of Example 5, except that the blend used to prepare the fusing surface layers and the cured slab was made up of 0.375 parts Catalyst 50, 75 parts LS4340-103 elastomer, and 25 parts X-52-875 silicone particulate. Abrasion and swell tests were conducted in the same manner as with Example 5, and the results of these tests also are shown in Table 1.

Additionally, as with Example 4, an axial section, with a width greater than 0.59 inch, was cut from one of the completed (i.e., oven cured and ground) fuser rollers, then trimmed to a strip 0.59 inch wide, and shaved to a uniform thickness of 1500 microns; also as with Example 4, the other of the completed fuser rollers was left unaltered. And as with Examples 3 and 4, abrasion testing was conducted with this strip in the same manner as with the strip that was cut from the post cured slab, and the result of this test also is shown in Table 1. Also as with Examples 3 and 4, the fuser roller sample wear rate was greater than the cured slab strip wear rate, and for the same reason —the smaller contact area between the test paper and the curved surface of the fuser roller sample.

EXAMPLE 10

A fuser roller, a cured slab, and test samples were prepared in substantially the same manner as those of Example 5, except that the blend used to prepare the fusing surface layer and the cured slab was made up of 0.25 parts Catalyst 50, 50 parts LS4340-103 elastomer, and 50 parts X-52-875 silicone particulate. Abrasion and swell tests were conducted in the same manner as with Example 5, and the results of these tests also are shown in Table 1.

EXAMPLE 11

Two fuser rollers were prepared in substantially the same manner as the fuser roller of Example 5, except that the blend used to prepare the fusing surface layer was made up of 0.365 parts Catalyst 50, 23 parts LS4340-103 elastomer, 21.5 parts KMP598 silicone particulate, and 100 parts EC4952 elastomer. Also, with this Example, no cured slab was prepared from this blend, so there were no slab-derived samples for abrasion testing or swell measurement.

However, in the same manner as with Examples 4 and 9, a strip was prepared from one of the fuser rollers and subjected to surface abrasion testing, and the result of this test also is shown in Table 1.

EXAMPLE 12

Two fuser rollers and a test sample were prepared in substantially the same manner as those of Example 11, except that the blend used to prepare the fusing surface layer was made up of 0.365 parts Catalyst 50, 50 parts LS4340-103 elastomer, 21.5 parts X-52-875 silicone particulate, and 100 parts EC4952 elastomer. An abrasion test was conducted in the same manner as with Example 11, and the result of this test is shown in Table 1.

TABLE 1

| | Silicone Participate (Discontinuous Phase Domains) | | $Al_2O_3$ Filler | | | |
|---|---|---|---|---|---|---|
| | Partic-ulate | Percent by Vol. of Fusing | Percent by Vol. of Fusing | Wear Rate (Mils/100 cycles) | | |
| Examples | (Domain) Size | Surface Layer | Surface Layer | Slab | Roll-er | Swell Level |
| Example 1 | N/A | 0 | 0 | 0.47 | — | 0.0246 |
| Example 2 | N/A | 0 | 20 | 0.4 | — | 0.023 |
| Example 3 | N/A | 0 | 25.4 | 0.8 | 2.28 | 0.018 |
| Example 4 | N/A | 0 | 39 | 1.28 | 3.23 | 0.0178 |
| Example 5 | 0.8 | 25 | N/A | 0.45 | — | 0.0124 |
| Example 6 | 0.8 | 50 | N/A | 1.26 | — | 0.0092 |
| Example 7 | 13 | 25 | N/A | 0.38 | — | 0.0160 |
| Example 8 | 13 | 50 | N/A | 0.41 | — | 0.0144 |
| Example 9 | 40 | 25 | N/A | 0.32 | 1.44 | 0.0141 |
| Example 10 | 40 | 50 | N/A | 0.33 | — | 0.010 |
| Example 11 | 13 | 25 | 20 | — | 1.58 | — |
| Example 12 | 40 | 25 | 20 | — | 1.60 | — |

N/A not applicable
— not evaluated

The data set forth in Table 1 show that the presence of the second elastomer discontinuous phase domains (in the form of preformed particulate) reduces swell caused by release agent oil. Where the discontinuous phase domains have a mean diameter greater than 0.8 microns, the wear rate is superior to that which is obtained where discontinuous phase elastomer is not employed, or where smaller second elastomer domains are employed. This data also shows that improved wear properties also result where both second elastomer domains and inorganic filler are present.

Testing Fuser Rollers for Resistance to Toner Offset

The fuser rollers of particular Examples are tested to determine their effectiveness in resisting toner contamination. Two different electrostatographic printer/copiers the Heidelberg Digimaster® 9110 and the Heidelberg Digimaster® 9150, both from Heidelberg Digital L.L.C., Rochester, N.Y. are used for this purpose.

With the Heidelberg Digimaster® 9110, the fuser set point temperature is 360° F., with all other set points at standard settings. The components of the Heidelberg Digimaster® 9110 are unchanged, except that polyester toner is used, and in place of the standard release fluid, there is employed a blend of 87.5 weight percent 60,000 centistoke DC200® polydimethylsiloxane oil and 12.5 weight percent of a stearic acid-monomamino polydimethylsiloxane complex.

The particular monomamino polydimethylsiloxane for preparing the complex is α-aminopropyldimethylsiloxy, ω-trimethylsiloxy terminated polydimethylsiloxane, having a number average molecular weight of 12,000, and an amine equivalent of about 13,000 grams per mole amine. To prepare the complex, 488.5 grams of the monoamino polydimethylsiloxane and 42.57 grams of the stearic acid are combined, and stirred at 105° C. for 15 minutes.

As to the Heidelberg Digimaster® 9150, the fuser set point temperature is 196° C., and the load is set at 400 lbs. Otherwise, the materials, hardware, and operating parameters are left unchanged.

In their operation, each of the Heidelberg Digimaster® 9110 and Heidelberg Digimaster® 9150 employs two heater rollers to heat the fuser roller. Toner offset from paper in the copying process is removed from the fuser roller by the heater rollers, by virtue of the high surface energy of the anodized aluminum surface of the heater rollers. A thin Nomex® cleaning web is used to remove toner offset from the heater rollers by contact with both. The configuration of the indicated system elements is that as shown in FIG. 1.

For each test of a fuser roller, the roller is employed with a printer/copier. Unfused toner is applied to a paper substrate, with the fuser roller being employed in the fixing of the toner to the paper. The test run is 2,500 prints, of a multiple density image.

After this run, the optical transmission density (dt), of toner collected on the cleaning web surface, is measured to determine contamination. An X-Rite 310 Transmission Densitometer, from X-Rite Company, is employed for this purpose.

The density of the toner offset collected by the cleaning web estimates the offset rate of the fuser. As discussed, this offset acts as contamination, and accordingly offset rate indicates the degree of contamination. Therefore, the density of this offset on the web is a measure of the degree of contamination. In making the toner optical transmission density measurements, clean webs are used to set i.e., calibrate the measured optical transmission density to zero. As to the values obtained from these measurements, a higher web transmission density indicates an increased fuser offset rate, and thusly a greater degree of contamination. Too great a level of contamination is indicative of toner offset on elements of the electrostatographic apparatus and on images, and can reduce fuser member life.

In this regard, generally with respect to contamination, cleaning web transmission densities below 0.3 are excellent, at 0.31 to 0.5 are good, at 0.51 to 0.79 are marginal, and at 0.8 and above can indicate unacceptable levels of contamination.

However, with certain toners—e.g., polyester toners, such as that employed here with the Heidelberg Digimaster® 9110 printer/copier—even lower contamination levels are desirable, in order to avoid irreversible buildup of contamination on the heater rollers. Specifically, it is believed that in these instances, achieving densities below 0.2 is the objective.

The fuser rollers of Examples 1, 2, and 10, and the unaltered fuser rollers of Examples 4 and 9, are tested on the Heidelberg Digimaster® 9110 printer/copier.

TABLE 2

| Examples | Web dt |
|---|---|
| Example 1 | 0.3 |
| Example 9 | 0.23 |
| Example 10 | 0.121 |
| Example 2 | 0.308 |
| Example 4 | 0.358 |

The foregoing results demonstrate that where a fusing surface layer incorporates the second elastomer discontinuous phase domains, less toner contamination is generated than with a fusing surface layer having thermally conductive filler but not the domains, or even with a fusing surface layer lacking both such filler and the elastomer domains. These results also demonstrate that the greater the proportion by volume of the second elastomer domains in the fusing surface layer, the less contamination that results with polyester toner.

And along with the indicated superior contamination values of the Example 9 and Example 10 fuser rollers, Examples 9 and 10 likewise exhibited less swell than Example 1, and less wear than Examples 1, and 4—as evidenced by the data of Table 1.

The same Example 1 and Example 2 fuser rollers that are tested on the Heidelberg Digimaster® 9110 printer/copier are also tested on the Heidelberg Digimaster® 9150 printer/copier, as are the unaltered fuser rollers of Examples 11 and 12. The results are set forth in Table 3.

TABLE 3

| Examples | Web dt |
|---|---|
| Example 1 | 0.3 |
| Example 2 | 0.235 |
| Example 11 | 0.2165 |
| Example 12 | 0.115 |

The Table 3 data show that with a fuser roller having a fusing surface layer including both second elastomer discontinuous phase domains and thermally conductive filler, less contamination results than in the absence of the elastomer domains. These data also show that the larger elastomer domains are particularly effective for lowering toner contamination.

And here also, in addition to the indicated superior contamination values of the Example 11 and Example 12 fuser rollers, the fusing surface layers of these rollers again as evidenced by the data of Table 1 showed a lower degree of wear, as compared to the wear exhibited by an equivalent material i.e., that of the cured slab of Example 2, which comprises the same material as the Example 2 fusing surface layer. While higher values did in fact result with the fuser roller wear rate samples of Examples 11 and 12, the reason is the same as that for the difference between the wear rate values of the Example 3 fuser roller and slab test samples i.e., the smaller contact area between the test paper and the curved surface of the fuser roller sample. And in any event, the composition of both the fusing surface layer and the cured slab of Example 2 is equivalent to that of the Example 11 and 12 fusing surface layers, by virtue of including the same thermally conductive filler, in the same proportion ($Al_2O_3$, 20 percent by volume) but lacking the Example 11 and 12 elastomer domains.

Finally, although the invention has been described with reference to particular means, materials, and embodiments, it should be noted that the invention is not limited to the particulars disclosed, and extends to all equivalents within the scope of the claims.

What is claimed is:

1. A fuser member for a toner fusing system, comprising:

(a) a base; and (b) a fusing surface layer comprising:

(i) a first elastomer, as a continuous phase; and (ii) a second elastomer, as a discontinuous phase, dispersed through the continuous phase in the form of domains;

wherein:

the second elastomer is wettable by the first elastomer;

the modulus of the second elastomer is greater than the modulus of the first elastomer, at the temperature of the fusing process;

the swell level of the first elastomer with a toner fusing system release agent is from about 0.2 to about 0.005;

the swell level of the second elastomer with the release agent is greater than zero; and the ratio of the second elastomer swell level to the first elastomer swell level with the release agent is from about 0.5:1 to about 0.02:1.

2. The fuser member of claim 1, wherein the second elastomer is spontaneously wettable by the first elastomer.

3. The fuser member of claim 1, wherein at least about 25 percent of the second elastomer total repeat units, and at least about 25 percent of the first elastomer total repeat units, are the same monomeric unit.

4. The fuser member of claim 3, wherein essentially all of the second elastomer total repeat units, and essentially all of the first elastomer total repeat units, are the same monomeric unit.

5. The fuser member of claim 1, wherein the first elastomer comprises at least one member selected from the group consisting of perfluoropolyether elastomers, fluoroelastomer elastomers, and polyorganosiloxane elastomers, and wherein the second elastomer comprises at least one member selected from the group consisting of perfiuoropolyether elastomers, fluoroelastomer elastomers, and polyorganosiloxane elastomers.

6. The fuser member of claim 5, wherein the first elastomer comprises a polyorganosiloxane elastomer, and wherein the second elastomer comprises a polyorganosiloxane elastomer.

7. The fuser member of claim 6, wherein the first elastomer comprises a polydimethylsiloxane elastomer, and wherein the second elastomer comprises a polydimethylsiloxane elastomer.

8. The fuser member of claim 7, wherein the first elastomer comprises a condensation cure polydimethylsiloxane elastomer, and the second elastomer discontinuous phase domains comprise polydimethylsiloxane elastomer particulate.

9. The fuser member of claim 1, wherein the second elastomer discontinuous phase domains have a mean diameter of from about 2 microns to about 60 microns.

10. The fuser member of claim 1, wherein the second elastomer discontinuous phase domains comprise from about 10 percent by volume to about 60 percent by volume of the fusing surface layer.

11. The fuser member of claim 1, wherein the fusing surface layer further comprises thermally conductive filler dispersed though the continuous phase, the thermally conductive filler comprising not more than about 35 percent by volume of the fusing surface layer.

12. The fuser member of claim 1, further comprising at least one cushion layer interposed between the base and the fusing surface layer, the at least one cushion layer comprising at least one polyorganosiloxane elastomer layer.

13. The fuser member of claim 12, wherein the fusing surface layer has a thickness of from about 75 microns to about 2,000 microns, and the at least one cushion layer has a total cushion thickness of from about 2,000 microns to about 10,000 microns.

14. A toner fusing system comprising:

(a) the fuser member of claim 1, for contacting and heating toner residing on a substrate to fuse the toner to the substrate, wherein:

(i) the first elastomer comprises a polyorganosiloxane elastomer;

(ii) the second elastomer comprises a polyorganosiloxane elastomer; and (iii) the fusing surface layer has a thickness of from about 5,000 microns to about 10,000 microns; and (b) at least one external heating member for heating the fusing surface layer, the at least one external heating member providing more than 50 percent of the heat energy for fusing the toner to the substrate.

15. A toner fusing system comprising:

(a) the fuser member of claim 1, for contacting and heating toner residing on a substrate to fuse the toner to the substrate, wherein:

(i) the first elastomer comprises a polyorganosiloxane elastomer;

(ii) the second elastomer comprises a polyorganosiloxane elastomer; and (iii) the fusing surface layer has a thickness of from about 250 microns to about 2,500 microns; and (b) at least one internal heating member for heating the fusing surface layer, the at least one internal heating member providing more than 50 percent of the heat energy for fusing the toner to the substrate.

16. A toner fusing system comprising:

(a) the fuser member of claim 1, for contacting and heating toner residing on a substrate to fuse the toner to the substrate, wherein:

(i) the first elastomer comprises a polyorganosiloxane elastomer;

(ii) the second elastomer comprises a polyorganosiloxane elastomer;

(iii) the fusing surface layer:

(A) has a thickness of from about 250 microns to about 760 microns; and (B) further comprises thermally conductive filler dispersed through the continuous phase, the thermally conductive filler comprising not more than about 35 percent by volume of the fusing surface layer;

(iv) the fuser member further comprises a cushion layer interposed between the base and the fusing surface layer, the cushion layer comprising a polyorganosiloxane elastomer layer;

(v) the total thickness of the fusing surface layer and the cushion layer is from about 2,000 microns to about 10,000 microns; and (b) at least one external heating member for heating the fusing surface layer, the at least one external heating member providing more than 50 percent of the heat energy for fusing the toner to the substrate.

17. A process for fusing toner residing on a substrate to the substrate, the process comprising:

(a) applying a polyorganosiloxane release agent to the fusing surface layer of the fuser member of claim 1, to provide a release agent-treated fusing surface layer:

(i) the first elastomer comprising a polyorganosiloxane elastomer; and (ii) the second elastomer comprising a polyorganosiloxane elastomer; and (b) contacting the toner with the release agent-treated fusing surface layer.

18. The process of claim 17,wherein:

(a) the polyorganosiloxane release agent comprises a polydimethylsiloxane release agent;

(b) the first elastomer comprises a polydimethylsiloxane elastomer; and (c) the second elastomer comprises a polydimethylsiloxane elastomer.

* * * * *